United States Patent
Weintraub et al.

(10) Patent No.: US 11,568,260 B2
(45) Date of Patent: Jan. 31, 2023

(54) EXPONENTIAL MODELING WITH DEEP LEARNING FEATURES

(71) Applicant: Google LLC, Mountain View, CA (US)

(72) Inventors: Mitchel Weintraub, Cupertino, CA (US); Ananda Theertha Suresh, Fremont, CA (US); Ehsan Variani, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 655 days.

(21) Appl. No.: 16/654,425

(22) Filed: Oct. 16, 2019

(65) Prior Publication Data
US 2020/0134466 A1    Apr. 30, 2020

Related U.S. Application Data

(60) Provisional application No. 62/752,128, filed on Oct. 29, 2018.

(51) Int. Cl.
| | | |
|---|---|---|
| *G06N 20/00* | (2019.01) | |
| *G06N 99/00* | (2019.01) | |
| *G06N 3/08* | (2006.01) | |
| *G06K 9/62* | (2022.01) | |
| *G06N 20/10* | (2019.01) | |

(52) U.S. Cl.
CPC ............. *G06N 3/084* (2013.01); *G06K 9/628* (2013.01); *G06N 20/00* (2019.01)

(58) Field of Classification Search
USPC ............................. 706/12, 15, 20, 31, 45, 62
See application file for complete search history.

(56) References Cited

U.S. PATENT DOCUMENTS

| | | | | |
|---|---|---|---|---|
| 11,281,969 | B1 * | 3/2022 | Rangapuram | G06V 10/82 |
| 2011/0099131 | A1 * | 4/2011 | Sellamanickam | G06N 20/00 706/54 |
| 2018/0165554 | A1 * | 6/2018 | Zhang | G06K 9/6256 |
| 2019/0156253 | A1 * | 5/2019 | Malyack | G06N 5/022 |
| 2019/0205829 | A1 * | 7/2019 | Abebe | G06K 9/6223 |

OTHER PUBLICATIONS

Berger et al, "A Maximum Entropy Approach to Natural Language Processing", Computational Linguistics, vol. 22, No. 1, 1996, 34 pages.
Hinton et al., "Distilling the Knowledge in a Neural Network", arXiv: 1503v1, Mar. 9, 2015, 9 pages.
Pietra et al, "Inducing Features of Random Fields", arXiv:cmp-lg, Jun. 13, 1995.

* cited by examiner

*Primary Examiner* — Daquan Zhao
(74) *Attorney, Agent, or Firm* — Dority & Manning, P.A.

(57) ABSTRACT

Aspects of the present disclosure enable humanly-specified relationships to contribute to a mapping that enables compression of the output structure of a machine-learned model. An exponential model such as a maximum entropy model can leverage a machine-learned embedding and the mapping to produce a classification output. In such fashion, the feature discovery capabilities of machine-learned models (e.g., deep networks) can be synergistically combined with relationships developed based on human understanding of the structural nature of the problem to be solved, thereby enabling compression of model output structures without significant loss of accuracy. These compressed models provide improved applicability to "on device" or other resource-constrained scenarios.

20 Claims, 4 Drawing Sheets

EXPONENTIAL MODELING WITH DEEP LEARNING FEATURES

PRIORITY CLAIM

This application claims priority to U.S. Patent Application Ser. No. 62/752,128, filed Oct. 29, 2018, and entitled "Exponential Modeling with Deep Learning Features," the disclosure of which is incorporated by reference herein in its entirety.

FIELD

The present disclosure relates generally to machine learning. More particularly, the present disclosure relates to machine-learned models that include an exponential model (e.g., a maximum entropy model) that leverages a mapping between output classes and embedding parameters to provide compression gains.

BACKGROUND

Various forms of machine-learned models have revolutionized many areas of machine intelligence. As an early example, at one point in the past, maximum entropy models provided state-of-art performance in the area of natural language processing and other technical fields. Maximum entropy models adhere to the principal that the model should supply the least biased estimate possible on the given information; that is, it is maximally noncommittal with regard to missing information. More recently, however, artificial neural networks ("neural networks") have driven state-of-the-art solutions to a number of problem areas, including natural language processing. One main reason that maximum entropy modeling has been overtaken as a learning algorithm is that the features to be used by the maximum entropy model are hand crafted and not automatically learned.

Neural networks are a class of machine-learned models that are especially powerful, accurate, or otherwise high-performing for various tasks. A neural network can include a group of connected nodes, which also can be referred to as (artificial) neurons or perceptrons. A neural network can be organized into one or more layers. Nodes of the neural network can be connected with edges and a weight can be associated with each edge.

Neural networks that include multiple layers can be referred to as "deep" networks. A deep network can include an input layer, an output layer, and one or more hidden layers positioned between the input layer and the output layer. The nodes of the neural network can be fully connected or non-fully connected. Example neural networks include feed-forward neural networks, recurrent neural networks, convolutional neural networks, other forms of artificial neural networks, or combinations thereof.

Various machine-learned models such as neural networks are being used in countless applications today. However, their accuracy stems in part from having a large number of parameters which incur a high compute and memory overhead. As one example, a typical neural network can include a large number of weights (e.g., ten thousand to ten million to ten billion) that may all have a unique value. Storing and running a neural network typically requires storing and performing mathematical operations with each of these values, which requires a not-insignificant amount of memory and processor usage.

This problem is exacerbated in scenarios in which machine-learned models are used as classifiers to classify an input into a very large number of different possible classes. In particular, a machine-learned model used as a classifier will often have an output layer (e.g., a softmax layer) or other output structure that provides a respective output value for each of the available classes, which can be an extremely large number for certain tasks. As one example, a neural network used to perform "next word prediction" or other natural language processing tasks will often have an output layer that includes a number of nodes that is equal to the number of words included in a vocabulary associated with the classifier, which may in some instances include around one million words. Current applications on a cell phone reduce the vocabulary to several tens of thousands of words, since a larger vocabulary will not currently fit on a cell phone. Models that reside on a server in the cloud might have several million words in the application's vocabulary. Thus, in these scenarios, an outsized proportion of the parameters of the network can be located in the output layer of the network and associated structures.

Furthermore, as networks and hardware become better and faster, much of the computation is being shifted to an "on device" paradigm in which the machine-learned models are stored and implemented locally on embedded devices, user devices, edge devices, or other forms of "resource-constrained" devices, thereby delivering faster response time and better security and privacy guarantees. In particular, it would be beneficial if these networks could be stored and run (and thus their accuracy benefits received) on mobile and other resource-constrained devices such as smart devices or embedded devices. However, due to the significant amount of computing resources such as processing resources and memory resources required to store and run the networks, their use in resource-constrained environments/devices is somewhat limited.

As such, various techniques to "compress" machine-learned models to reduce their compute and memory overhead have been proposed with some success. However, to date, powerful solutions for achieving compression gains with respect to the output layer of a model that outputs into a very large number of different possible classes have not been identified.

SUMMARY

Aspects and advantages of embodiments of the present disclosure will be set forth in part in the following description, or can be learned from the description, or can be learned through practice of the embodiments.

One example aspect of the present disclosure is directed to a computer system that includes one or more processors and one or more non-transitory computer-readable media that collectively store a machine-learned classification model configured to generate a classification output that includes a plurality of classification scores respectively for a number of discrete classes based on a set of input data. The classification score for each discrete class is indicative of a likelihood that the input data corresponds to the discrete class. The machine-learned classification model includes an embedding model and an exponential model. The embedding model is configured to receive the set of input data and produce an embedding based on the set of input data. The embedding includes a number of parameter values respectively for a number of parameters included in a final layer of the embedding model. The number of parameter values is less than the number of discrete classes. The exponential model is configured to receive the embedding and apply a mapping to generate the classification output. The mapping describes a plurality of relationships between the number of parameters included in the final layer of the embedding model and the number of discrete classes.

In some implementations, the exponential model includes a maximum entropy model.

In some implementations, the plurality of relationships specify, for each of the number of discrete classes, one or more of the number of parameters to which such discrete class is mapped.

In some implementations, for each of the number of discrete classes, the exponential model determines its respective classification score based at least in part on a first exponential raised to the power of a first sum of the parameter values to which such discrete class is mapped by the mapping divided by a sum of all possible output values.

In some implementations, at least one of the discrete classes is mapped to two or more of the parameters included in the final layer of the embedding model.

In some implementations, at least one of the parameters included in the final layer of the embedding model is mapped to two or more of the discrete classes.

In some implementations, at least one of the plurality of relationships described by the mapping is user-specified.

In some implementations, at least one of the plurality of relationships described by the mapping is deterministically assigned.

In some implementations, at least one of the plurality of relationships is generated according to a heuristic.

In some implementations, at least one of the plurality of relationships is machine-learned.

In some implementations, the number of discrete classes include a number of discrete words included in a vocabulary.

In some implementations, at least one of the plurality of relationships described by the mapping is based on the presence of one or more specified characters within each discrete word.

In some implementations, at least one of the plurality of relationships described by the mapping is based on the presence of a specified string of two or more characters within each discrete word.

In some implementations, the set of input data includes one or more words surrounding a word to be classified.

In some implementations, the number of discrete classes include a number of discrete items available for selection by a recommender system.

In some implementations, the number of discrete classes includes a number of objects.

In some implementations, at least one of the plurality of relationships described by the mapping is based on a shared characteristic among a subset of the plurality of discrete classes.

In some implementations, the embedding model includes a neural network.

In some implementations, the embedding model includes a recurrent neural network.

In some implementations, the embedding model includes a convolutional neural network.

In some implementations, the embedding model include one or more additional layers positioned structurally prior to the final layer of the embedding model such that the final layer of the embedding model does not directly receive the set of input data.

In some implementations, the final layer of the embedding model directly receives the set of input data such that the final layer is the only layer of the embedding model.

In some implementations, the number of parameters of the last layer of the embedding model is a user-specified hyperparameter.

In some implementations, the classification score for each discrete class is indicative of a probability of such class given the set of input data.

In some implementations, the machine-learned classification model has been trained on a set of labeled training data using a supervised learning technique.

In some implementations, the supervised learning technique includes backpropagating a gradient of a loss function through the plurality of parameters according to the mapping.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
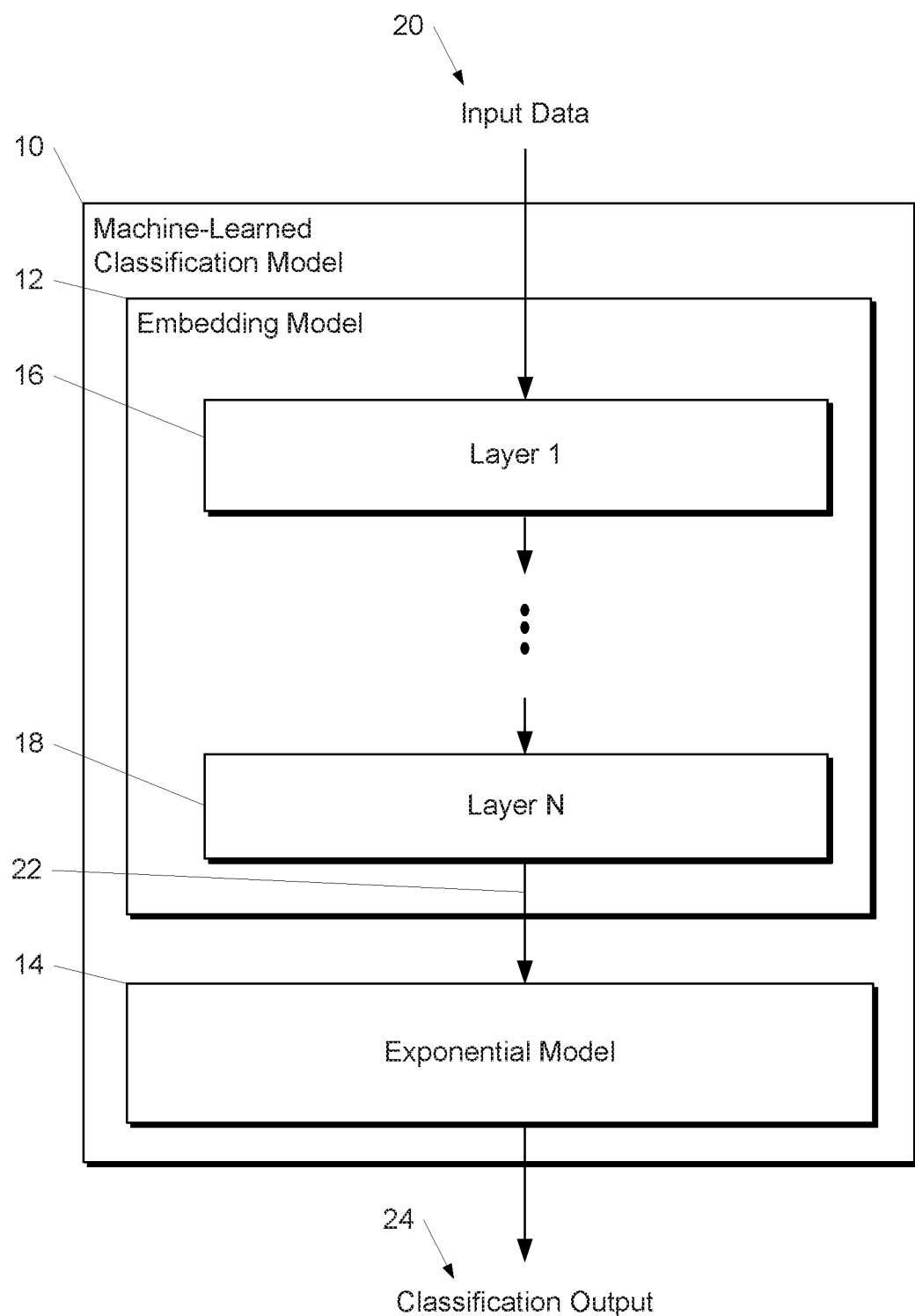
FIG. 1 depicts a block diagram of an example machine-learned classification model according to example embodiments of the present disclosure.

Reference numerals that are repeated across plural figures are intended to identify the same features in various implementations.

DETAILED DESCRIPTION

Overview

Generally, the present disclosure is directed to machine-learned models that leverage the benefits provided by the combination of deep learning with exponential modeling structures such as, for example, maximum entropy models. More particularly, as described above, one main reason that maximum entropy modeling has been overtaken as a learning algorithm is that the features to be used by the maximum entropy model are hand crafted and, unlike neural networks, not automatically learned. However, the present disclosure demonstrates that exponential modeling techniques such as maximum entropy modeling can be combined with deep learning modeling to achieve a unique combination of benefits.

In particular, for many tasks, deep learning models typically end with a softmax layer that is used for classification or conditional estimate of probabilities. However, according to an aspect of the present disclosure, if the output of the deep learning model (e.g., an embedding or logit vector present just prior to the softmax layer) is instead considered to be available for feature modeling, then the benefits of both forms of modeling can be achieved. In particular, the features can be learned automatically by the deep learning network while compression gains in the output layer can be achieved by establishing relationships at least in part according to human knowledge regarding the structure of the problem to be solved. This provides the flexibility of using exponential models combined with the feature discovery mechanisms of deep learning. The combination of the two modeling techniques can be very useful for more complicated modeling of the output compared to a deep network ending in the standard softmax layer.

According to an aspect of the present disclosure, a machine-learned model can include both an embedding model (e.g., a neural network) and an exponential model (e.g., a maximum entropy model). The embedding model can produce an embedding based on a set of input data. In some implementations, the embedding model can include or be similar to the portion of a neural network positioned prior to an exponential softmax layer. As such, in some implementations, the embedding can include the data output by a last layer of the embedding model which can include or be similar to the data output by a last layer of a deep neural network before the exponentiation of the features (e.g., the last layer prior to the softmax layer).

The exponential model can leverage and apply a mapping that describes relationships between output classes and the parameters of the embedding produced by the embedding model to produce a classification output based on the embedding (e.g., based on the sharing of maximum entropy features). For example, the classification output can classify input data with respect to a number of discrete classes.

Importantly, the number of parameters included in the embedding can be significantly smaller than the number of possible output classes (e.g., ~1k feature output versus ~1M classes of the softmax output). As such, the mapping from the embedding to the output classes can be termed a "few to many" mapping. In such fashion, significant compression gains can be achieved because the model is not required to have either an output layer that has a node for each distinct output class (e.g., ~1M nodes) or a set of weights to compute the output from the upstream representation. Instead, the mapping and exponential functions can be applied to the embedding to produce the classification output for each discrete class directly from the embedding. Thus, example implementations of the present disclosure can be viewed as altering a traditional deep neural network that requires a separate unique feature for each discrete output, to a case where each discrete output is described as a unique combination of features from the deep neural network output.

According to another aspect of the present disclosure, in some implementations, at least some of the relationships defined between the embedding parameters and the discrete classes can be based on or generated from human knowledge or understanding of the problem to be solved. Thus, some or all of the relationships included in the mapping can be user-defined or established. In particular, example relationships that can be defined may typically leverage human understanding of shared or differentiating characteristics or properties of one or more classes which enable them to be compared to or distinguished from other classes. This creation of hand-generated features is the reason that maximum entropy modeling was overtaken by deep learning modeling. However, the present disclosure develops a way in which these hand-generated features can create a structure for the class output, instead of just a long sequence of arbitrary symbols.

As one example, for a natural language processing task, a set of output classes may correspond to a set of words in a vocabulary (e.g., "they", "cat", "bat", "car", "moose", etc.). A number of different relationships can be defined that leverage human understanding of language structures. As one example, all words (i.e., classes) that include the character "a" can be mapped to a first parameter of the embedding. Thus, the words "cat", "bat", and "car" would be mapped to share the value of the first parameter while the words "they" and "moose" would not be mapped to use the value of this first parameter. As another example, all words with the two-character string of "at" can be mapped to a second, different parameter of the embedding. Thus, the words "cat" and "bat" would both be mapped to share the value of the second parameter while the words "they", "car", and "moose" would not be mapped to share the value of the second parameter. Thus, in this example, the word 'cat' is no longer the result of a single 'cat' parameter or neuron, but instead is the sum of a variety of features, such as, for example: the 'c' feature value, the 'a' feature value, the T feature value, the 'ca.' feature value, the 'at' feature value and the 'cat' feature value.

In other, non-language examples, various other characteristics of possible output classes can be mapped to one or more parameters. As one example, in a book recommendation system, a first subset of books that share an author might be mapped to share the value of a first parameter while a second subset of books that share a publication year might be mapped to a second parameter, and so on. As yet another example, in an object recognition system, a first subset of objects that have eyes might be mapped to a first parameter while a second subset of objects that are green in color might be mapped to a second parameter. Thus, various relationships can be defined which leverage and benefit from a human understanding of structures associated with the problem to be solved. Current deep neural networks do not use any structure such as the one described above. It is this ability to impose a structure created by a man or machine onto a deep neural network that allows the resulting system to dramatically decrease the number of parameters. Describing a book by features such as the author, year published, length of book, type of novel, if it is poetry, if it is news, and so on allows a very compact representation to describe objects that previously were just a number: e.g. "Book ISBN # 0553278398". Saying that the book has the author: "Isaac Asimov" and is book_type: "Science Fiction" gives a much more intuitive feel for the likelihood of this book, compared to it's ISBN number.

Further, although portions of the present disclosure focus on relationships that are humanly-specified, the systems and methods of the present disclosure are not limited to humanly-specified relationships. For example, in some implementations, in addition or alternatively to humanly-specified relationships, relationships between classes and embedding parameters can be machine-learned or algorithmically produced. As another example, in some implementations, in addition or alternatively to humanly-specified relationships, relationships between classes and embedding parameters can be randomly assigned. As another example, the features can be generated by a computer. For example, people who searched for the word 'camera' also searched for the word 'tripod'. Therefore, these two words could be assigned a feature that they should share.

In addition, although the relationships included in the mapping may initially be defined based on or guided by a human understanding of the structure of the problem to be solved and/or shared or differentiating characteristics of output classes, the ability of the embedding model to learn its internal parameters and representations after such relationships are defined means that the embedding model is not specifically constrained to satisfy the exact human intuition behind the relationship. Instead, during the learning process, the embedding model has the flexibility to shift the underlying meaning and/or re-weight the importance of various relationships.

As an example, for the example relationship describe above where a subset of books that share an author is be mapped to a first parameter, although the human intuition driving such relationship is based on knowledge of the shared author, this information is not communicated to imposed as a constraint upon the embedding model. Instead, the embedding model simply learns that to classify an input into one of the books included in the relevant group, that the embedding model should increase the parameter value assigned to the corresponding embedding parameter. Thus, the embedding model is free to learn its own relationships and features within the structures specified by the human. This enables the human to contribute domain-specific structural knowledge while still enabling the automatic learning of features by the embedding model.

Stated differently, the embedding model's constraint is that the sum of the human-defined features should be large when the target object is the true label. The human-defined relationships between objects means that certain combined sets of features should be large. In the above example, the science fiction book by Isaac Asimov is the sum of two features: the author's name and the type of book. The embedding model's constraint is that the two features sum to a large value when a shopper is interested in this book. The computer is free to assign any value it likes to the author feature or the book-type feature. It's only constraint is that the sum of the two is large.

Thus, aspects of the present disclosure enable humanly-specified relationships to contribute to a mapping that enables compression of the output structure of a machine-learned model. An exponential model such as a maximum entropy model can combine the feature extraction abilities of the machine-learned embedding with the human-designed features that describe the classes to be modeled to produce the classification output. In such fashion, the feature discovery capabilities of machine-learned models (e.g., deep networks) can be synergistically combined with relationships developed based on human understanding of the structural nature of the problem to be solved, thereby enabling compression of model output structures without significant loss of accuracy. These compressed models provide improved applicability to "on device" or other resource-constrained scenarios.

Aspects of the present disclosure also leverage the fact that both the softmax layer of a deep neural network and the maximum entropy formulation are exponential models. This recognition enables the systems and methods of the present disclosure to incorporate aspects of the maximum entropy modeling technique into the deep learning technique, hoping to take advantage of the best properties of both techniques. The structure that is imposed on the deep learning softmax is intended to increase the model compression so that it can accurately model the softmax probabilities with a much smaller number of parameters, leading to model compression. This description of the softmax is related to the logits part of the modeling. Based on this relationship to the softmax, the same process could be duplicated for the embedding matrix factorization process.

In view of the above, one technical effect and benefit of the present disclosure is to provide machine-learned models that more efficiently use computing resources such as processor usage, memory usage, network bandwidth, and the like, thereby enabling application of the models to resource-constrained scenarios. Stated differently, the systems and methods of the present disclosure enable savings of computing resources such as processor usage, memory usage, network bandwidth, and the like and further enable applications to be fielded on resource-constrained devices such as smartphones, home appliances, embedded computers, and/or the like.

With reference now to the Figures, example embodiments of the present disclosure will be discussed in further detail.

Example Machine-Learned Model Structures

As one example of the concepts described herein, FIG. 1 provides an example of a machine-learned model classification model 10 that leverages the benefits provided by the combination of machine-learned features with exponential modeling structures, according to example aspects described herein.

In particular, the machine-learned classification model 10 can be configured to generate a classification output 24 based on a set of input data 20. The input data 20 can be any form of data depending on the type of problem to be solved. As examples, the input data 20 can be image data (e.g., for object recognition), textual data (e.g., for next word prediction), audio data (e.g., for speech to text analysis), sensor data, and/or other modalities of data.

The classification output 24 can provide a plurality of classification scores respectively for a number of discrete classes (e.g., 1 million or more words in a vocabulary). For example, the classification scores can be respective conditional probabilities for the discrete classes given the input data 20 as previous observations. Thus, in some implementations, the classification output 24 does not specifically select a certain class but instead simply provides a respective probability for each class. Various techniques can be performed to generate a classification from the provided probabilities (e.g., select class with highest probability, select top 5 classes with top 5 high probabilities, select any class with a probability greater than a threshold value, etc.).

According to an aspect of the present disclosure, the machine-learned model classification model 10 can include both an embedding model 12 and an exponential model 14 that is positioned subsequent to the embedding model 12. The embedding model 12 can be configured to receive the set of input data 20 and produce an embedding 22 based on the set of input data 20.

In some implementations, the embedding model 12 can be a multi-layer structure such as, for example, a deep neural network (e.g., a deep recurrent neural network, convolutional neural network, or the like). Thus, as an example, the embedding model 12 illustrated in FIG. 1 includes N layers (with a first layer 16 and an $N^{th}$ layer 18 illustrated). However, the embedding model 12 can include any number of layers, including, in some examples, only a single layer. Further, in some implementations, the embedding model 12 can be other forms of machine-learned models other than a neural network, including, for example, a support vector machine, a linear model, a logistic regression model, and/or other forms of models.

In some implementations, the embedding 22 can include a number of parameter values respectively for a number of parameters included in a final layer 18 of the embedding model 12. As one example, the embedding model 12 can be similar to a standard neural network except that the embedding model does not include a softmax layer. Thus, in some implementations, the embedding 22 provided by the embedding model 12 can be referred to as or otherwise similar to a logits layer of a neural network. However, in some implementations, the mapping can also include or refer to parameter values from layers other than the final layer 18 of the embedding model 12. Thus, parameter values from any portion of the embedding model 12 can be used.

In some implementations, the parameter values of the embedding 22 can be numerical in nature and the parameters of the embedding 22 can exist within embedding dimensions that are generally not humanly-comprehensible. Further, in some implementations, the embedding model 12 can be trained (e.g., via a triplet training scheme) to produce embeddings 22 in which a distance (e.g., Euclidian distance) between two embeddings is indicative of a similarity between two sets of input data respectively associated with the embeddings. In other implementations, embeddings 22 are not usable to determine similarity between sets of input data.

The embedding 22 can include any number of parameters. As two examples, in some implementations, the embedding 22 can include 96 parameters or 2048 parameters. In some implementations, the number of parameters included in the embedding 22 can be a user-specified hyperparameter. For example, the user can directly specify the number of parameters included in the embedding 22, can specify a ratio between the number of parameters included in the embedding 22 and the number of discrete classes associated with the classification output 24, or can specify a compression gain to be achieved (e.g., 3×, 10×, 500×, etc.).

Generally, however, the number of parameters included in the embedding 22 is less than the number of discrete parameters needed to compute the classification output 24 (e.g., ~1M versus ~1B). In such fashion, significant compression gains can be achieved.

More particularly, the machine-learned model classification model 10 can also include the exponential model 14 positioned subsequent to the embedding model 12. The exponential model 14 can be configured to receive the embedding 22 and apply a mapping to generate the classification output 24 of the classification model 10.

In particular, according to another aspect of the present disclosure, the mapping applied by the exponential model 14 can describe a plurality of relationships between the parameters included in the final layer 18 of the embedding model 12 (i.e., the parameters of the embedding 22) and the number of discrete classes. The plurality of relationships can specify, for each of the number of discrete classes, one or more of the number of parameters to which such discrete class is mapped. As described above, generally the number of parameters of the embedding 22 will be smaller than the number of discrete classes. Thus, at least one of the discrete classes will be mapped to two or more of the parameters included in the final layer 18 of the embedding model 12 and/or at least one of the parameters included in the final layer 18 of the embedding model 12 is mapped to two or more of the discrete classes.

According to another aspect, at least some of the relationships between the parameters of the final layer 18 and the discrete classes can be user-defined, and, in such fashion, the exponential model can be similar to or operate in the fashion of a maximum entropy model in which the parameter values output by the embedding model 12 serve as the features to be used by the maximum entropy model. Thus, some or all of the relationships included in the mapping can be user-defined or established. In particular, example relationships that can be defined may typically leverage human understanding of shared or differentiating characteristics or properties of one or more classes which enable them to be compared to or distinguished from other classes.

As one example, for a natural language processing task, a set of output classes may correspond to a set of words in a vocabulary (e.g., "they", "cat", "bat", "car", "moose", etc.). A number of different relationships can be defined that leverage human understanding of language structures. Table 1 immediately below provides an example of a number of different example relationships that can be defined in a natural language processing task.

TABLE 1

|  | Characteristic | Parameter # |
|---|---|---|
| Relationship 1 | Contains 'A' | 1 |
| Relationship 2 | Contains 'B' | 2 |
| Relationship 3 | Contains 'C' | 3 |
| . . . | . . . | . . . |
| Relationship 27 | Contains 'AA' | 27 |
| Relationship 28 | Contains 'AB' | 28 |
| Relationship 29 | Contains 'AC' | 29 |
| . . . | . . . | . . . |

The example relationships included in Table 1 are provided as examples only. Many other and different relationships can be used as well. For example, additional characteristics such as the inclusion of a three character string "ing" could be defined or another example characteristic may consider whether the input data is "followed immediately by the word 'April'". Further, although a single parameter number is mapped in each relationship, in some implementations, two or more parameters may be mapped to a characteristic in a relationship.

In other, non-language examples, various other characteristics of possible output classes can be mapped to one or more parameters. As one example, in a book recommendation system, a first subset of books that share an author might be mapped to a first parameter while a second subset of books that share a publication year might be mapped to a second parameter, and so on. However, in some instances, the number of unique authors might require too many parameters. So, another mapping might divide the 'author' feature into a different set of features: the first name of the author, the middle name of the author, the last name of the author. This is the flexibility that using a maximum entropy model gives. For a very uncommon last name of an author, the author's last name can be composed as the sequence of letters in his last name. It is possible that very popular authors will get to be modeled with their full names. Medium popular authors might get modeled with their first and last name. And very unknown authors might be modeled with the characters in their name.

As yet another example, in an object recognition system, a first subset of objects that have eyes might be mapped to a first parameter while a second subset of objects that are green in color might be mapped to a second parameter. Thus, various relationships can be defined which leverage and benefit from a human understanding of structures associated with the problem to be solved.

For any set of discrete entities, any set of features that a human might use to describe the qualities of those entities may be used as the structure that helps the computer compress the representation. This could be the color, shape, taste, smell, concept, place of manufacture, materials making up the product, and so on. A virtually unlimited set of features can be defined by the user to impose a structure on the modeling of the discrete entities. It is likely that if a human thinks a feature is relevant (e.g., is it made in the USA might be relevant to whether a product would be purchased) then it could be useful for modeling the likelihood of that entity by the computer. Labels by an expert art dealer (e.g., is the product 'art deco', 'post modernism', etc.) and any other type of label can be used to impose a structure that could be useful in compressing the computers model. The ability of a human to define features that was so powerful for maximum entropy models is now available to be combined with deep learning modeling with this technique.

Further, although portions of the present disclosure focus on relationships that are humanly-specified, the systems and methods of the present disclosure are not limited to humanly-specified relationships. For example, in some implementations, in addition or alternatively to humanly-specified relationships, relationships between classes and embedding parameters can be machine-learned or algorithmically produced. In one example, a clustering algorithm (e.g., overlapping clusters) can be performed and respective parameters can be assigned based on cluster membership. For example, there are computer programs that try to learn synonyms. All words that a computer labels as synonyms might then share a feature in the modeling network. In another example, a pre-trained embedding model (e.g., pre-trained to produce embeddings where distance between embeddings is indicative of similarity—one example might be the Word2vec models) can be used to assign respective embeddings to each discrete class. The discrete classes can then be clustered based on their embeddings and parameter relationships assigned based on the clusters. In another example, one or more parameters can be initially assigned to each discrete class and these assignments can be treated as learnable parameters. Thus, the number and/or nature of the mapping relationships can be re-arranged and learned via a learning algorithm. In another example, quantization techniques (e.g., product quantization) can be used to generate class quantizers and parameter mappings for each class can be based on distance of the particular class from one or more of the class quantizers. In another example, principal component analysis (PCA) can be performed on the discrete classes and parameter mappings for each class can be assigned based on relationships between the classes within the PCA component space (cluster within component space and assign parameters based on cluster membership). There are many other computer modeling techniques such as Singular Value Decomposition, Non-negative matrix factorization, and other techniques that can all be used to define computer features for the modeling technique.

As another example, in some implementations, in addition or alternatively to humanly-specified relationships, relationships between classes and embedding parameters can be randomly assigned. As one example, each discrete class can be randomly mapped to two different parameters. For example, the mapping can be pseudo-random such that more common/probably classes share parameters with less frequency; while less common/probable classes share parameters with greater frequency.

Referring again to FIG. 1, in some implementations, the exponential model can determine the respective classification score for each of the number of discrete classes based at least in part on a first exponential raised to the power of a first sum of the parameter values to which such discrete class is mapped by the mapping divided by a second exponential raised to the power of a second sum of all of the parameter values.

To provide an example, refer again to Table 1 which provides an example set of relationships which may be included in an example mapping. Table 2 provided below provides an example of application of the relationships in Table 1 to particular example inputs.

TABLE 2

| Word | Maps to Parameters |
| --- | --- |
| cab | 1, 2, 3, 28, . . . |
| ab | 1, 2, 28 |

Thus, as an example, referring to Tables 1 and 2 together, the word "cab" maps to parameters 1, 2, 3, and 28 because it contains the character strings "a", "b", "c", and "ab", respectively. The word "ab" maps to parameters 1, 2, and 28, but does not map to parameter 3 because it does not contain the character string "3".

As described above, in some implementations, the exponential model can determine the respective classification score for each of the number of discrete classes based at least in part on a first exponential raised to the power of a first sum of the parameter values to which such discrete class is mapped by the mapping divided by a sum of all possible output values. Thus, in some instances, for each discrete class, the exponential model can evaluate the following expression:

$$\text{score}(c_j) = \frac{e^{\left(\Sigma_{i \in k_j} x_i\right)}}{\sum_{m=1}^{l} e^{\left(\Sigma_{i \in k_m} x_i\right)}}$$

where l is the total number of output classes c, $c_j$ is the jth discrete class, $x_i$ is the value of the ith parameter of the embedding, n is the total number of parameters included in the embedding, and $k_j$ is the set of parameters to which class $c_j$ is mapped.

Thus, as an example in light of the examples of Tables 1 and 2, the output score for the word "ab" may be determined according to the following expression:

$$\text{score}(ab) = \frac{e^{(x_1 + x_2 + x_{28})}}{\sum_{m=1}^{l} e^{\left(\Sigma_{i \in k_m} x_i\right)}}$$

The classification model 10 can be any type of classification model used for any purpose. As one example, the classification model 10 can be a next word prediction model and the number of discrete classes can respectively correspond to a number of discrete words included in a vocabulary. As another example, the classification model 10 can be a language translation model and the number of discrete classes can respectively correspond to a number of discrete words included in a vocabulary. In some of these instances, the input data 20 can include data that describes one or more words that surround (e.g., precede) a word to be classified/predicted.

As another example, the classification model 10 can be a recommendation model and the number of discrete classes can correspond to a number of products or other items (e.g., movies, books, clothing items, etc.) that can be recommended to a user based on the input data 20. For example, the input data 20 might describe previous items for which the user indicated approval or with which the user otherwise interacted. As yet another example, the number of discrete classes can correspond to a number of objects that are available for recognition (e.g., types of cars, dog breeds, etc.). Thus, aspects of the present disclosure can be applied in any number of different situations, contexts, or use cases.

Example Devices and Systems

Figure 2A:
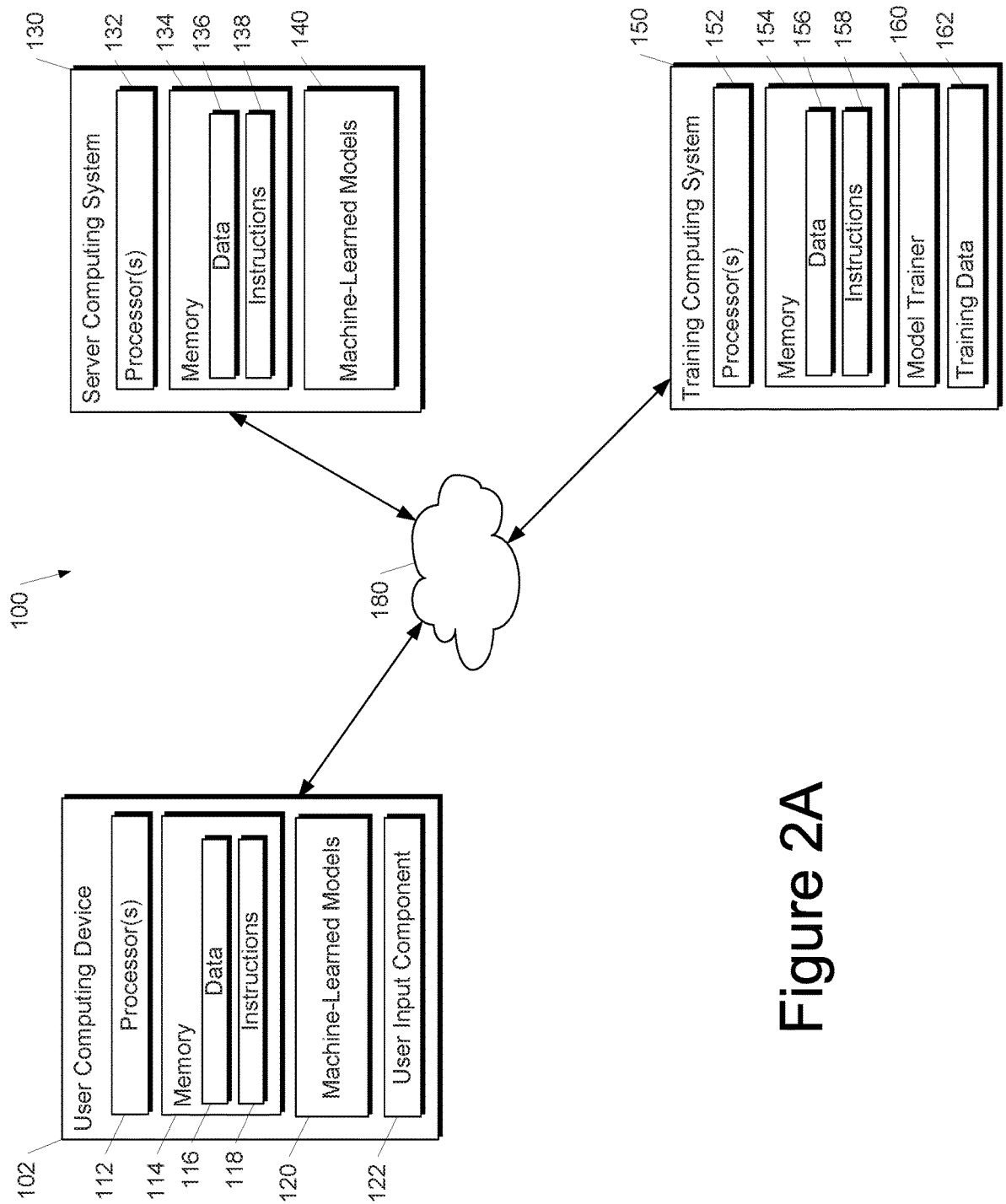
FIG. 2A depicts a block diagram of an example computing system according to example embodiments of the present disclosure.

FIG. 2A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a GPU, a custom chip such as a Tensor Processing Unit, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIG. 1.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel classification across multiple instances of input data).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a natural language processing service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 1.

The user computing device 102 and/or the server computing system 130 can train the models 120 and/or 140 via interaction with the training computing system 150 that is communicatively coupled over the network 180 or downloaded to the local device. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, a set of labeled training data that includes example input data that has been labeled with a ground truth classification (e.g., a "correct" probability for one or more discrete classes).

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 2A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 2B:
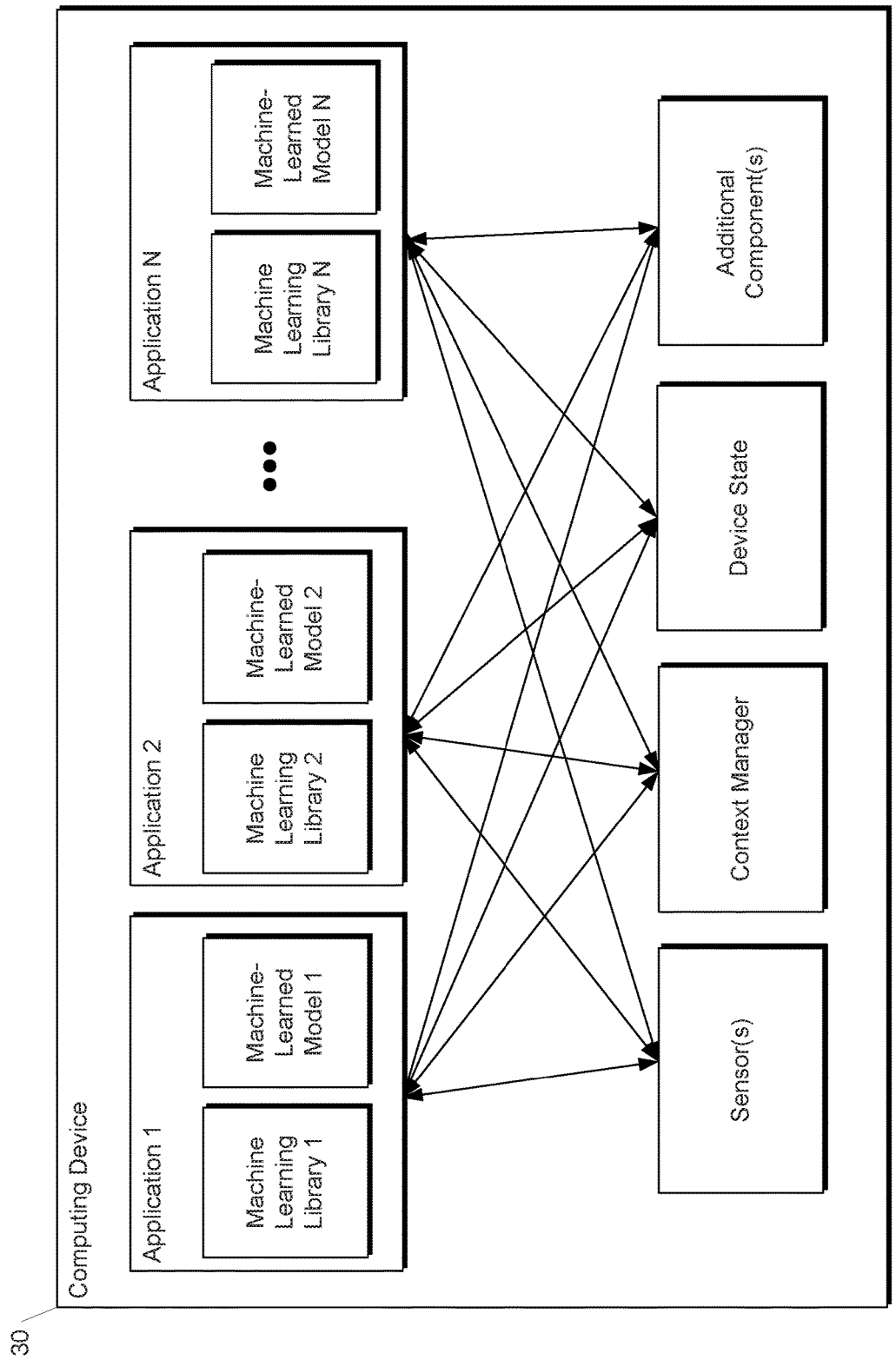
FIG. 2B depicts a block diagram of an example computing device according to example embodiments of the present disclosure.

FIG. 2B depicts a block diagram of an example computing device 30 according to example embodiments of the present disclosure. The computing device 30 can be a user computing device or a server computing device.

The computing device 30 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 2B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 2C:
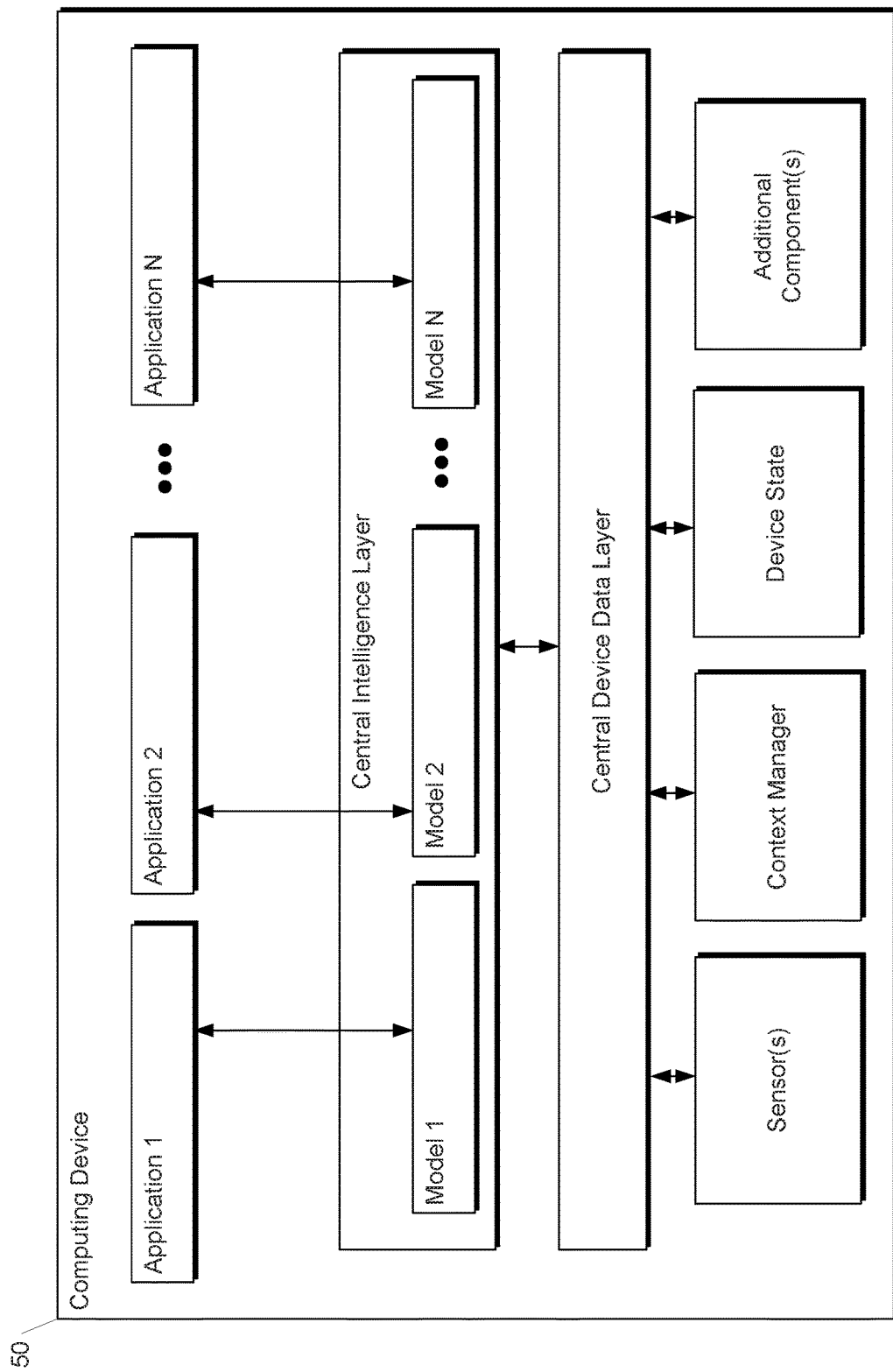
FIG. 2C depicts a block diagram of an example computing device according to example embodiments of the present disclosure.

FIG. 2C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 2C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 2C, the central device data layer can communicate with a number of other components of the computing device, such as, for example, one or more sensors, a context manager, a device state component, and/or additional components. In some implementations, the central device data layer can communicate with each device component using an API (e.g., a private API).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer system, comprising:
   one or more processors; and
   one or more non-transitory computer-readable media that collectively store a machine-learned classification model configured to generate a classification output that comprises a plurality of classification scores respectively for a number of discrete classes based on a set of input data, the classification score for each discrete class indicative of a likelihood that the input data corresponds to the discrete class;
   wherein the machine-learned classification model comprises a combination of an embedding model and an exponential model;
   wherein the embedding model is configured to receive the set of input data and produce an embedding based on the set of input data, wherein the embedding comprises a number of parameter values respectively for a number of parameters included in a non-softmax final layer of the embedding model such that the number of parameters included in the final layer of the embedding model is less than the number of discrete classes; and
   wherein the exponential model is configured to receive the embedding and apply a mapping to generate the plurality of the classification scores of the classification output, wherein the mapping describes a plurality of relationships between the number of parameters included in the final layer of the embedding model and the number of discrete classes.

2. The computer system of claim 1, wherein the exponential model comprises a maximum entropy model.

3. The computer system of claim 1, wherein the plurality of relationships specify, for each of the number of discrete classes, one or more of the number of parameters to which such discrete class is mapped.

4. The computer system of claim 1, wherein, for each of the number of discrete classes, the exponential model determines its respective classification score based at least in part on a first exponential raised to the power of a first sum of the parameter values to which such discrete class is mapped by the mapping divided by a sum of all possible output values.

5. The computer system of claim 1, wherein at least one of the discrete classes is mapped to two or more of the parameters included in the final layer of the embedding model.

6. The computer system of claim 1, wherein at least one of the parameters included in the final layer of the embedding model is mapped to two or more of the discrete classes.

7. The computer system of claim 1, wherein at least one of the plurality of relationships described by the mapping is user-specified.

8. The computer system of claim 1, wherein at least one of the plurality of relationships described by the mapping is deterministically assigned.

9. The computer system of claim 1, wherein at least one of the plurality of relationships is machine-learned.

10. The computer system of claim 1, wherein the number of discrete classes comprise a number of discrete words included in a vocabulary.

11. The computer system of claim 10, wherein at least one of the plurality of relationships described by the mapping is based on the presence of one or more specified characters within each discrete word.

12. The computer system of claim 10, wherein at least one of the plurality of relationships described by the mapping is based on the presence of a specified string of two or more characters within each discrete word.

13. The computer system of claim 1, wherein the number of discrete classes comprise a number of discrete items available for selection by a recommender system.

14. The computer system of claim 1, wherein at least one of the plurality of relationships described by the mapping is based on a shared characteristic among a subset of the plurality of discrete classes.

15. The computer system of claim 1, wherein the embedding model comprises one or more additional layers positioned prior to the final layer of the embedding model such that the final layer of the embedding model does not directly receive the set of input data.

16. The computer system of claim 1 wherein the final layer of the embedding model directly receives the set of input data such that the final layer is the only layer of the embedding model.

17. The computer system of claim 1 wherein the number of parameters of the last layer of the embedding model is a user-specified hyperparameter.

18. The computer system of claim 1 wherein the machine-learned classification model has been trained on a set of labeled training data using a supervised learning technique, wherein the supervised learning technique includes back-propagating a gradient of a loss function through the plurality of parameters according to the mapping.

19. A computer-implemented method, comprising:
   obtaining, by one or more computing devices, a set of input data;
   inputting, by the one or more computing devices, the set of input data into a machine-learned classification model configured to generate a classification output that comprises a plurality of classification scores respectively for a number of discrete classes based on a set of input data, the classification score for each discrete class indicative of a likelihood that the input data corresponds to the discrete class, wherein the machine-learned classification model comprises a combination of an embedding model and an exponential model, wherein the embedding model is configured to receive the set of input data and produce an embedding based on the set of input data, wherein the embedding comprises a number of parameter values respectively for a number of parameters included in a non-softmax final layer of the embedding model such that the number of parameters included in the final layer of the embedding model is less than the number of discrete classes, and wherein the exponential model is configured to receive the embedding and apply a mapping to generate plurality of classification scores of the classification output, wherein the mapping describes a plurality of relationships between the number of parameters included in the final layer of the embedding model and the number of discrete classes; and receiving, by the one or more computing devices, the classification output of the machine-learned classification model.

20. The computer-implemented method of claim 19, further comprising, training the machine-learned classification model on a set of labeled training data using a supervised learning technique.

* * * * *